(12) United States Patent
Oh et al.

(10) Patent No.: US 11,202,414 B2
(45) Date of Patent: Dec. 21, 2021

(54) DEVICE FOR UV AND LOW-TEMPERATURE TREATMENT FOR ENHANCING FUNCTIONAL MATERIAL OF PLANT

(71) Applicant: INDUSTRY-UNIVERSITY COOPERATION FOUNDATION OF CHUNGBUK NATIONAL UNIVERSITY, Cheongju-si (KR)

(72) Inventors: Myung Min Oh, Cheongju-si (KR); Jin Hui Lee, Cheongju-si (KR)

(73) Assignee: INDUSTRY-UNIVERSITY COOPERATION FOUNDATION OF, Cheongju-si (KR)

( * ) Notice: Subject to any disclaimer, the term of this patent is extended or adjusted under 35 U.S.C. 154(b) by 293 days.

(21) Appl. No.: 16/337,190

(22) PCT Filed: Sep. 27, 2017

(86) PCT No.: PCT/KR2017/010662
§ 371 (c)(1),
(2) Date: Mar. 27, 2019

(87) PCT Pub. No.: WO2018/062821
PCT Pub. Date: Apr. 5, 2018

(65) Prior Publication Data
US 2019/0223390 A1 Jul. 25, 2019

(30) Foreign Application Priority Data
Sep. 27, 2016 (KR) .................. 10-2016-0123821

(51) Int. Cl.
*A01G 9/24* (2006.01)
*A01G 7/04* (2006.01)
(Continued)

(52) U.S. Cl.
CPC .............. *A01G 9/24* (2013.01); *A01G 7/04* (2013.01); *A01G 7/045* (2013.01); *A01G 9/0299* (2018.02);
(Continued)

(58) Field of Classification Search
CPC .......... A01G 7/045; A01G 7/04; A01G 9/24; A01G 9/0299; A01G 9/1423; A01G 9/20; A01G 9/245; A01G 9/247; A01G 9/26
See application file for complete search history.

(56) References Cited

U.S. PATENT DOCUMENTS

| 9,021,739 B2 | 5/2015 | Koo et al. |
| 2014/0225003 A1* | 8/2014 | Koo .......................... A01G 7/04 250/454.11 |
| 2016/0029578 A1* | 2/2016 | Martin .................... A01G 31/02 47/62 R |

FOREIGN PATENT DOCUMENTS

| JP | 10-178927 | 7/1998 |
| JP | 10178927 A * | 7/1998 |

(Continued)

OTHER PUBLICATIONS

International Search Report dated Jan. 11, 2018, in International Application No. PCT/KR2017/010662 (with English Translation).
(Continued)

*Primary Examiner* — Timothy D Collins
*Assistant Examiner* — Brittany A Lowery
(74) *Attorney, Agent, or Firm* — H.C. Park & Associates, PLC

(57) ABSTRACT

A device including a work table having an upper plate elevated from a floor, a cultivation bed disposed on the upper plate and including an accommodation hole to accommodate soil or culturing solution therein, and a flow tube disposed in the soil or culturing solution to supply or drain water to and from the accommodation hole, a supply portion to
(Continued)

circulate water in the flow tube to lower the temperature of water, a light emitting portion including a pillar adjustable in height and a UV light source emit UV light toward an upper portion of the cultivation bed, and a power generator including a servo motor disposed below the work table, and a bracket configured to adjust a location of the light emitting portion with respect to the side surface of the work table.

10 Claims, 3 Drawing Sheets

(51) Int. Cl.
    *A01G 9/20*     (2006.01)
    *A01G 9/029*     (2018.01)
    *A01G 9/26*     (2006.01)

(52) U.S. Cl.
    CPC ............... *A01G 9/20* (2013.01); *A01G 9/247* (2013.01); *A01G 9/26* (2013.01); *Y02P 60/14* (2015.11)

(56) References Cited

FOREIGN PATENT DOCUMENTS

| | | |
|---|---|---|
| JP | 2008-000132 | 1/2008 |
| JP | 2008000132 A * | 1/2008 |
| JP | 2009-268377 | 11/2009 |
| KR | 10-0508400 | 8/2005 |
| KR | 20-0392435 | 8/2005 |
| KR | 10-2014-0102481 | 8/2014 |

OTHER PUBLICATIONS

Extended European Search Report dated Apr. 16, 2020 to European Patent Application No. 17856707.9.

* cited by examiner

DEVICE FOR UV AND LOW-TEMPERATURE TREATMENT FOR ENHANCING FUNCTIONAL MATERIAL OF PLANT

CROSS REFERENCE TO RELATED APPLICATION

This application is a National Stage Entry of International Patent Application No. PCT/KR2017/010662, filed on Sep. 27, 2017, and claims priority from and the benefit of Korean Patent Application No. 10-2016-0123821, filed on Sep. 27, 2016, each of which is incorporated by reference for all purposes as if fully set forth herein.

BACKGROUND

Field

Exemplary embodiments of the inventive concepts relate to a device for UV and low temperature treatment for increasing a functional material content in a plant, such as artificially applying slight stress to a plant to increase the functional material content therein without deteriorating the growth of the plant through an energy controllable UV treatment device and a low temperature treatment device.

Discussion of the Background

In recent years, with increasing interests in vegetables or medicinal crops containing large functional material contents, research for obtaining crops with enhanced functional material contents have also been increasing.

Generally, a plant exposed to various environmental stress is known to have an increased phytochemical content as a defense mechanism against the stress. Accordingly, artificial treatment to crops with mild stress may increase functional material contents therein without deteriorating the growth of the crops.

Various studies have found that artificial treatment with ultraviolet (UV) light, among various environmental stress, increases the functional material content in crops. However, studies or information on a device for UV light treatment have been insufficient.

For example, Korean Patent Registration No. 10-0508400 entitled "Plant Growing Apparatus" (hereinafter, "Registered Invention") relates to a plant cultivation device and, more particularly, to a plant cultivation device, in which water is supplied in the form of mist from the bottom of a cultivation box planted with seeds or seedlings of various plants to allow water and oxygen to be uniformly supplied, while suitably maintaining an inner temperature of the plant cultivation box and humidity outside the plant cultivation box, thereby improving the growth rate.

The plant cultivation device in the Registered Invention includes: a rectangular parallelepiped spray box open at an upper surface thereof and having a recovery port at a bottom surface thereof to maintain the temperature and humidity suitable for plant growth, and to supply moisture in the form of mist to improve germination or growth rate without decaying or drying of seeds or roots; a water supply pipe disposed on an inner side surface of the spray box in a longitudinal direction and provided with a plurality of nozzles at predetermined intervals; a cultivation box in which seeds or seedlings are planted, the cultivation box being supported on the spray box and formed with a plurality of water holes; a heater heating the spray box to maintain an inner temperature of the spray box at a predetermined temperature; a temperature sensor disposed inside the spray box to measure the inner temperature of the spray box; and a controller stopping the heater when the temperature measured by the temperature sensor is higher than or equal to a predetermined temperature, and operating the heater when the temperature measured by the temperature sensor is less than or equal to a predetermined temperature.

In addition, the water supply pipe is provided with a humidity pipe having spray nozzles arranged at predetermined intervals, in which the humidity pipe is bifurcated outside the spray box, and a humidity sensor for measuring the humidity is disposed outside the spray box. The controller is adapted to allow water and air to be sprayed through the spray nozzles of the humidity pipe when the humidity measured by the humidity sensor is less than or equal to a predetermined humidity, and to prevent water and air from being sprayed through the spray nozzles of the humidity pipe when the humidity measured by the humidity sensor is greater than or equal to a predetermined humidity.

In the plant cultivation device according to Registered Invention, since water is sprayed under the seed or roots of the plant through the nozzles, water can be uniformly distributed to upper and lower portions of the cultivation box, and oxygen can be sufficiently supplied to the plant while maintaining the temperature and humidity suitable for seed germination rate and seedling growth.

However, since the plant cultivation device in the Registered Invention is designed for a uniform growth of a plant, the plant cultivation device of the Registered Invention does not increase the phytochemical content using a defense mechanism of the plant.

The above information disclosed in this Background section is only for understanding of the background of the inventive concepts, and, therefore, it may contain information that does not constitute prior art.

SUMMARY

A device for UV and low temperature treatment according to exemplary embodiments are capable of increasing a functional material content of a plant without deteriorating the growth of a seed thereof through treatment with slight light stress during growth of the plant, based on a principle that the phytochemical content increases in the plant, as a defense mechanism, when the plant is exposed to various environmental stresses during its growth.

A device for UV and low temperature treatment according to exemplary embodiments are also capable of increasing a functional material content, such as sulfur oxide substances, in a plant without deteriorating the growth of the plant by allowing accumulation of secondary metabolites as a defense mechanism in the plant without excessive generation of reactive oxygen species (ROS) through the application of stress with UV light and low temperature during the growth of the plant.

A device for UV and low temperature treatment for increasing a functional material content in a plant according to an exemplary embodiment provides a work table including an upper plate elevated from a floor, a cultivation portion including a cultivation bed disposed on the upper plate, the cultivation bed includes an accommodation hole to accommodate soil or culturing solution therein, and a flow tube disposed in the soil or culturing solution and configured to supply or drain water to and from the accommodation hole, a supply portion including a circular pump, the supply portion being configured to circulate water in the flow tube to lower the temperature of water below a room temperature, such that the accommodation hole has a low temperature condition from heat exchange between water and the soil or culturing solution, a light emitting portion including a pillar disposed to intersect a side surface of the work table to be adjustable in height and crossing the cultivation bed, and a UV light source disposed in the pillar and being configured to emit UV light toward an upper portion of the cultivation bed, and a power generator including a servo motor disposed below the work table, and a bracket configured to adjust a location of the light emitting portion with respect to the side surface of the work table.

The work table may further include a hole to couple the pillar on the side surface of the work table, and a rail groove formed on the side surface of the work table along a longitudinal direction thereof through which the pillar can slide thereon.

The cultivation portion may further include a reflection portion covering an upper portion of the cultivation bed, the reflection portion may include a shielding layer configured to maintain the temperature in the cultivation bed, and a reflective layer formed on the shielding layer to reflect UV light emitted from the light emitting portion.

The pillar may be perpendicularly disposed with the rail groove to receive power from the power generator, and the pillar may include a first adjustment bar extending from an upper end of the pillar and being adjustable in height through adjustment of an installation location thereof, a second adjustment bar disposed at an upper end of the first adjustment bar and extending in a direction intersecting a longitudinal direction of the pillar, the second adjustment bar including a second fastening bolt disposed at the upper end of the first adjustment bar to adjust an angle of the UV light source coupled to the second adjustment bar, and a guide block disposed inside the pillar and inserted into the rail groove of the work table.

The pillar may further include an adjustment hole formed through the upper end of the pillar, perpendicularly disposed on the side surface of the work table, and having an elongated shape to allow height adjustment of the pillar in the longitudinal direction, a latch hole formed at a lower end of the pillar to receive a drive force transferred from the servo motor, a coupling groove formed between the adjustment hole and the latch hole, to which the guide block is inserted to for sliding into the rail groove, and a first fastening bolt inserted into the adjustment hole and screwed to a first fastening hole of the first adjustment bar to allow height adjustment of the pillar.

The guide block may include an insertion piece protruding outwardly to pass through from an inner side to an outer side of the rail groove of the work table, such that a surface of the insertion piece contacts a surface of the rail groove while sliding on the rail groove, a support piece protruding from one side of the insertion piece and having a greater width than a width of the rail groove, such that that support piece slides along a periphery of the rail groove when the insertion piece slides along the rail groove, and a fastening screw fastened to the pillar through the support piece and the insertion piece, such that the pillar is fastened to the rail groove to slide along the side surface of the work table.

The servo motor may be configured to transfer a clockwise and counterclockwise rotational force to the pillar, and the power generator may further include first and second sprockets disposed together with the servo motor at front and rear locations in a space under the work table, respectively, to form a clockwise/counterclockwise movement trajectory of the pillar, a driving chain mounted with tension on the first and second sprockets, the bracket being configured to be driven in association with the driving chain, and a support pin protruding from a side surface of the bracket to transfer the drive force to the latch groove of the pillar.

The circulation pump of the supply portion may be configured to supply water supplied from an exterior to the cultivation bed and discharge water subjected to heat exchange while flowing through the cultivation bed, and the supply portion may further include a cooler configured to lower the temperature of the water supplied from the circulation pump.

According to the exemplary embodiments, it is possible to increase functional material contents in crops using an energy adjustable UV treatment device and a low temperature treatment device for roots of the crops, the conditions of which may be adjusted depending upon the size and kinds of crops demanded by consumers. Accordingly, the inventive concepts according to exemplary embodiments may be used as a technique for enhancing nutritional quality of crops.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
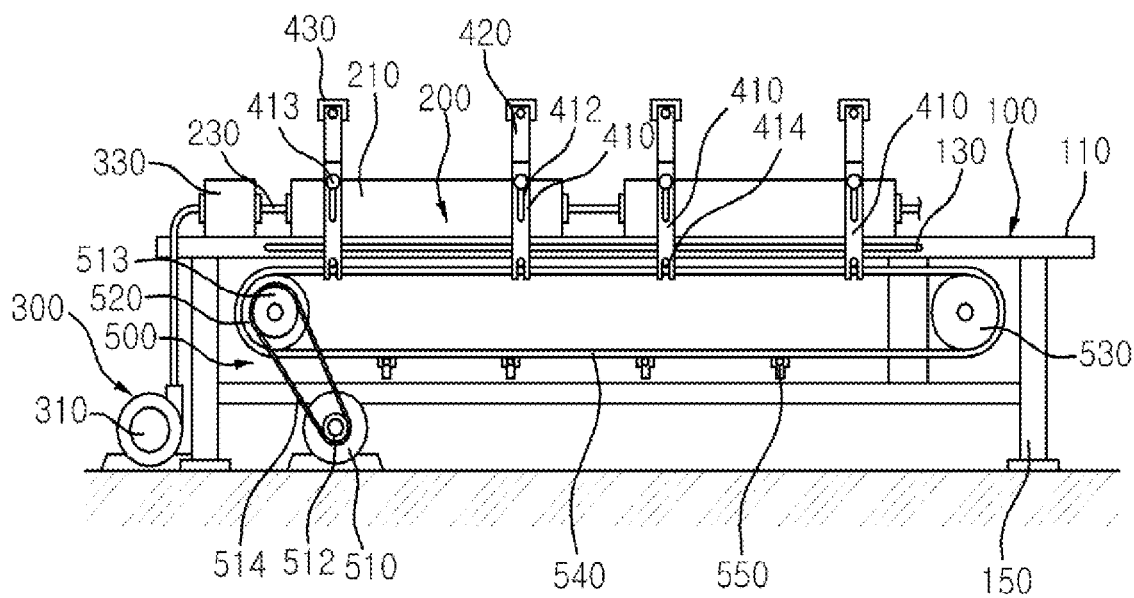
FIG. 1 is a schematic view of a UV treatment device and a root low temperature treatment device for increasing a functional material content of a plant according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

A device according to exemplary embodiments is capable of increasing a functional material content of a crop through UV treatment, such as a crop grown in a greenhouse or a closed plant factory. In particular, rails on which a UV light source (LED or lamp) may move along may be formed at both sides of a cultivation bed, and the height of the UV source may be adjusted.

From the viewpoint of enhancing functional material contents in a crop, UV irradiation energy is very important when the crop is irradiated with UV light. As such, a desired UV energy may be obtained by adjusting a distance between a UV light source and the crop, and between the UV light sources, for example. In addition, various kinds of crops (buds adults) with enhanced functional material contents can be obtained through UV treatment according to exemplary embodiments.

UV treatment of bud crops may also provide a sterilization effect. In some exemplary embodiments, a monitoring system for monitoring an energy in real time may also be attached under the crop.

In an exemplary embodiment, the UV light source (LED or lamp) may be manufactured to rotate in 360 degrees. Since a UV LED has a strong linear characteristic, leaves under the UV light source are less likely to receive UV light emitted from the UV LED. Accordingly, the UV LED may be disposed in the middle of the leaves and rotate to secure uniform UV treatment to the crop.

Further, in some exemplary embodiments, a reflective plate may be attached to an upper portion of the cultivation bed to increase the intensity of UV light. In order to reduce a risk to an operator, a dark cover may be provided. The cultivation bed may include a water supply portion to supply a nutrient solution, and a drain portion through which the nutrient solution is discharged. When the crops are cultivated by a DFT (deep floating technique) system, the cultivation bed may be a Styrofoam type bed, which may allow cultivation of crops in flowerpot form upon removal of the Styrofoam while providing simultaneous UV treatment.

Further, in some exemplary embodiments, a cooler may be disposed under the cultivation bed to reduce the temperature of water flowing to the roots of crops, thereby enabling low temperature treatment or combined treatment with UV light and low temperature.

Since air conditioning costs for reducing air temperature are very high, especially in large-scale production of crops, it may be more practical to use the cooler to reduce the temperature of crop roots.

Further, when UV treatment and low temperature treatment are performed at substantially the same time, more stress can be applied to shoots and roots of the crops, thereby reducing days for stress treatment.

Hereinafter, the UV treatment device for increasing a functional material content of a crop according to exemplary embodiments will be described with reference to the accompanying drawings.

Figure 2:
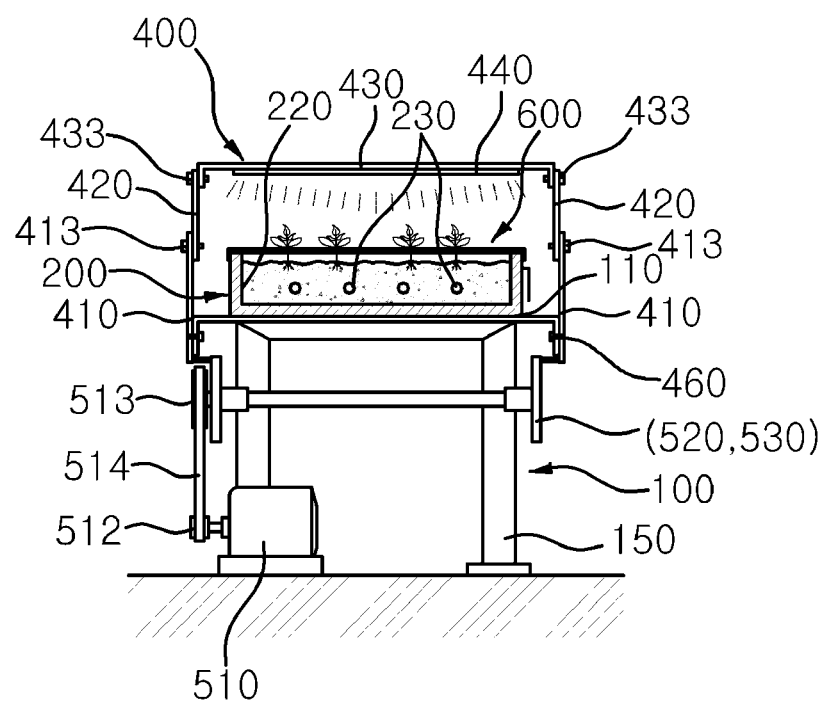
FIG. 2 is a side view of the UV treatment device and the root low temperature treatment device according to an exemplary embodiment.

FIG. 1 is a front view of a UV treatment device and a root low temperature treatment device for increasing a functional material content according to an exemplary embodiments, and FIG. 2 a side view of the UV treatment device and the root low temperature treatment device according to an exemplary embodiment.

Referring to FIGS. 1 and 2, a work table 100 is provided with an upper plate 110, which is elevated upright from the floor by support legs 150, a cultivation portion 200 disposed on an upper surface of the upper plate 110 to allow cultivation of seedlings (hereinafter referred to as a "plant") therein, a light emitting portion 400 disposed on a side surface of the upper plate 110 to emit UV light towards the plant growing in the cultivation portion 200, and a power generator 500 disposed below the upper plate 110 to adjust an emission location of a UV light source.

The cultivation portion 200 disposed on the upper plate 110 of the work table 100 includes an accommodation hole 220, to which soil and water for growth of a plant are supplied, and a cultivation bed 210 provided with a flow tube 230, which is disposed inside the soil or a culturing solution in the accommodation hole 220, such that the water can be supplied to or returned back through the flow tube 230.

The cultivation bed 210 may have a substantially rectangular shape and may be formed of a synthetic resin or Styrofoam. The cultivation bed 210 is formed with the accommodation hole 220, which is filled with soil or a culturing solution for providing growth conditions for a plant, or stores water to be supplied to the cultivation bed 210. The accommodation hole 220 is provided with the flow tube 230, which guides the flow of underground water or nutrient water.

The flow tube 230 provided in the accommodation hole 220 of the cultivation bed 210 cools the water flowing through the flow tube 230 to have a temperature lower than room temperature, and is connected to a supply portion 300, which allows the water to be returned back therethrough after heat exchange. The water maintains the accommodation hole 220 under a low temperature condition through heat exchange between the water and the soil or the cultivating solution, while flowing through the soil or the cultivating solution of the cultivation bed 210. The supply portion 300 is disposed on the floor around the work table 100 for installation safety and ease of handling.

The supply portion 300 includes a circulation pump 310 disposed on the floor to be connected to an inlet of the flow tube 230 of the cultivation portion 200 to apply pressure to the water, and a cooler 330 connected to the cultivation bed 210 to cool the water flowing in the cultivation bed 210. The cooler 330 may be provided on the upper plate 110, on which the cultivation bed 210 is disposed, for convenience of installation and management of the flow tube 230 provided with a cooling system.

An outlet of the flow tube 230 passing through the accommodation hole 220 of the cultivation bed 210 is connected to the circulation pump 310 to form a circulation trace of the cultivation bed 210 in the work table 100.

In addition, the work table 100 is provided with the light emitting portion 400, which emits UV light for providing stress growth environments to a plant growing therein.

In order to allow a plant growing on the work table 100 to be uniformly or intensively irradiated with UV light emitted from the light emitting portion 400, the light emitting portion 400 may be disposed to slide along the longitudinal direction of the work table 100.

Figure 3:
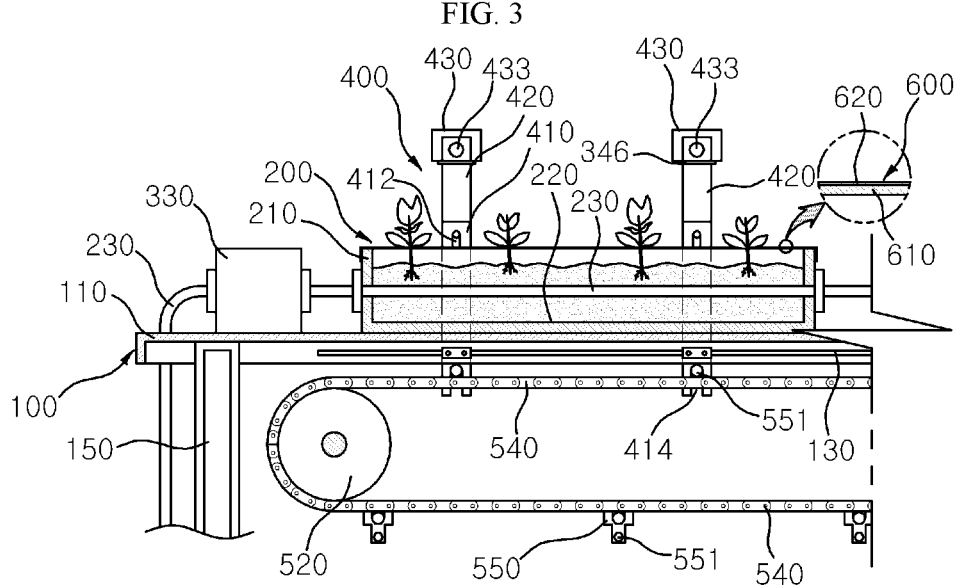
FIG. 3 is a partially enlarged cross-sectional view of a cultivation bed and a light emitting portion according to an exemplary embodiment.

FIG. 3 is a partially enlarged cross-sectional view of a cultivation bed and a light emitting portion according to an exemplary embodiment. Referring to FIG. 3, the light emitting portion 400 includes a pillar 410 perpendicularly disposed on a side surface of the upper plate 110 of the work table 100, so as to extend across an upper space of the cultivation bed 210.

Each of the light emitting portion 400 disposed across the upper space of the cultivation bed 210 is provided at an upper end of the pillar 410 with a UV light source 440 disposed to face a plant, and emitting UV light towards the plant. At the pillar 410, the UV light source 440 can be adjusted in height along the perpendicular direction of the pillar 410. In addition, the UV light source 440 can be adjusted in angle at the top end of the pillar 410.

The height of the pillar 410 is adjustable by a first adjustment bar 420 extending in the longitudinal direction of the pillar 410, an adjustment hole 412 formed at an upper end of the pillar 410 and extending in the longitudinal direction of the pillar 410, a first fastening hole 421 (see FIG. 4) formed through the first adjustment bar 420, and a first fastening bolt 413 (see FIG. 4) inserted into the adjustment hole 412 and screwed to the first fastening hole 421. In this manner, the location of the first adjustment bar 420 can be adjusted in the adjustment hole 412 of the pillar 410 by fastening or unfastening the first fastening bolt 413, whereby the height of the light emitting portion 400 can be adjusted through adjustment of the location of the first adjustment bar 420.

In particular, when the first fastening bolt 413 screwed to the first fastening hole 421 of the first adjustment bar 420 through the adjustment hole 412 of the first fastening bolt 413 is rotated in the clockwise direction to unfasten the first fastening bolt 413 from the first adjustment bar 420, the first fastening bolt 413 can be moved in the longitudinal direction within the range of the adjustment hole 412. In this manner, the height of the first adjustment bar 420 may be adjusted on the pillar 410 by the movement distance of the first fastening bolt 413.

The UV light source 440 emits UV light towards a plant on the upper plate 110, and the angle of UV light source 440 may be adjusted on the pillar 410 in a state, in which the second fastening bolt 433 inserted into the second fastening hole 422 formed at an upper end of the first adjustment bar 420 are screwed to the coupling hole 431 formed at the second adjustment bar 430. In particular, the second fastening bolt 433 is inserted into the second fastening hole 422 and screwed to the coupling hole 431.

When the second fastening bolt 433 is rotated in an unfastening direction, the angle of the second adjustment bar 430 is adjusted about the second fastening hole 422 of the first adjustment bar 420, thereby allowing the angle of the UV light source 440 to be arbitrarily adjusted by an operator. When the second fastening bolt 433 is rotated in a fastening direction to secure the second adjustment bar 430 at the location of the second fastening hole 422 of the first adjustment bar 420, the UV light source 440 on the second adjustment bar 430 can emit UV light in an adjusted direction.

The light emitting portion 400 disposed on the side surface of the work table 100 may be movable along the longitudinal direction of the work table 100 while being disposed upwardly from the work table 100.

Figure 4:
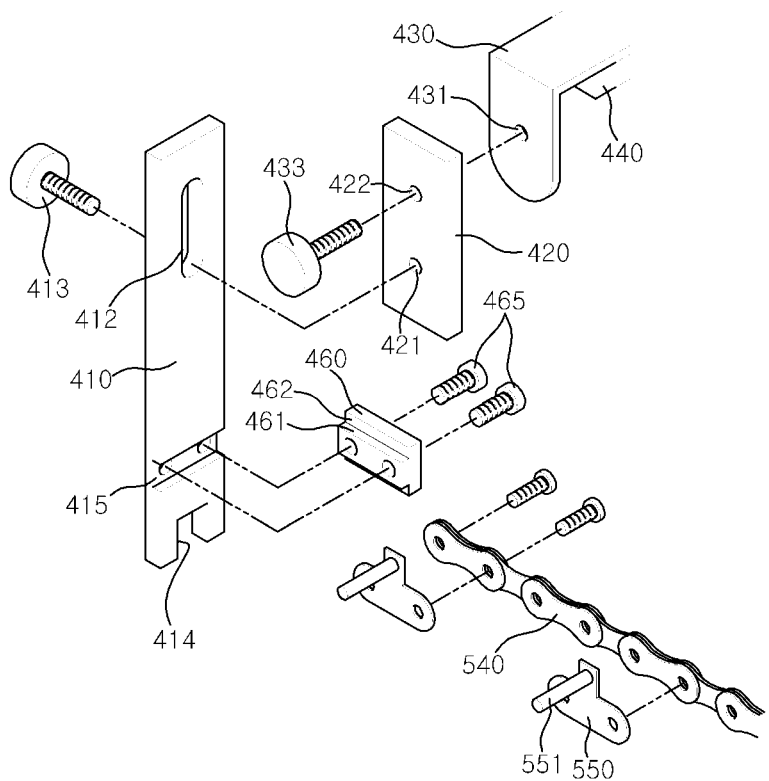
FIG. 4 is an exploded perspective view of a light emitting portion according to an exemplary embodiment.
Figure 5:
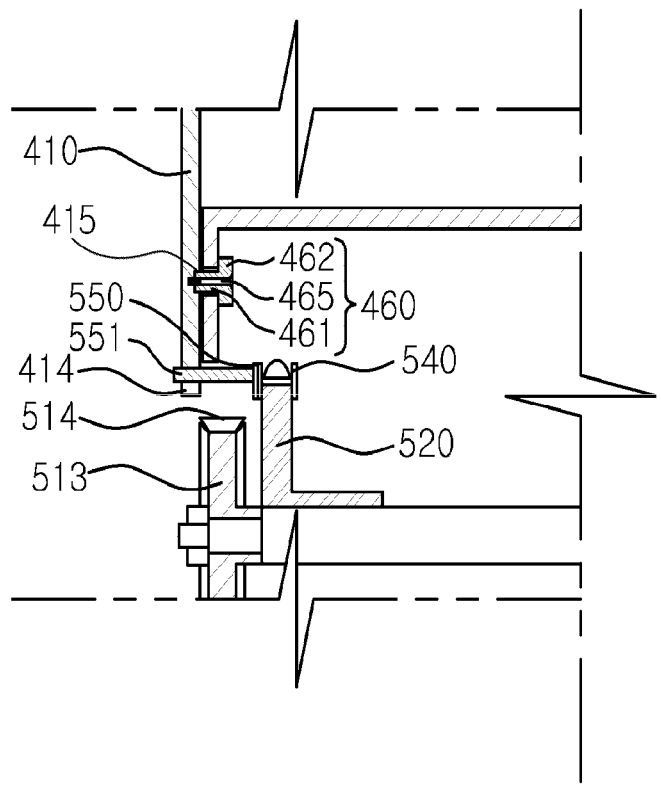
FIG. 5 is a cross-sectional view of a state when the drive force is supplied from a power generator to the light emitting portion according to an exemplary embodiment.

Configuration of the light emitting portion 400 that allows movement is exemplarily illustrated in FIG. 4, which shows an exploded perspective view of a light emitting portion according to an exemplary embodiment, and FIG. 5, which is a cross-sectional view showing a state in which the drive force is supplied from a power generator to the light emitting portion according to an exemplary embodiment.

A rail groove 130 is formed on the side surface of the upper plate 110 of the work table 100, for example, by cutting the side surface of the upper plate 110 in the longitudinal direction of the work table 100.

A guide block 460 is coupled to the rail groove 130 formed on the side surface of the upper plate 110 to be coupled to the pillar 410 of the light emitting portion 400.

The guide block 460 includes an insertion piece 461, which protrudes from one side thereof with a width to be inserted into the rail groove 130. The guide block 460 also includes a support piece 462, which protrudes from the other side thereof with a greater width than the width of the rail groove 130 and extending beyond the rail groove 130. In addition, a through-hole is formed through the support piece 462 of the guide block 460 toward the insertion piece 461 to receive fastening screw 465 therein.

The guide block 460 is coupled to the pillar 410 through the rail groove 130 of the work table 100. To this end, a back surface of the pillar 410 is formed with a coupling groove 415, to which the insertion piece 461 of the guide block 460 is coupled.

In the light emitting portion 400 capable of being slid along the work table 100, the insertion piece 461 of the guide block 460 is inserted into the rail groove 130 formed on the side surface of the work table 100 in the longitudinal direction of the work table 100 to contact the pillar 410 after passing through the rail groove 130. A leading end of the insertion piece 461 is assembled to the coupling groove 415 of the pillar 410 to connect the pillar 410 to the guide block 460.

Then, the pillar 410 is coupled to both side surfaces of the upper plate 110 of the work table 100 by inserting the fastening screws 465 into the through-hole at one side of the support piece 462, and fastening the fastening screws 465 to the pillar 410. In this manner, the pillar 410 can be maintained in an upright state with respect to the side surfaces of the upper plate 110 through face-to-face contact between the insertion piece 461 and the rail groove 130, and the insertion piece 461 can be slid on the rail groove 130 while maintaining the face-to-face contact with the rail groove 130.

Figure 6:
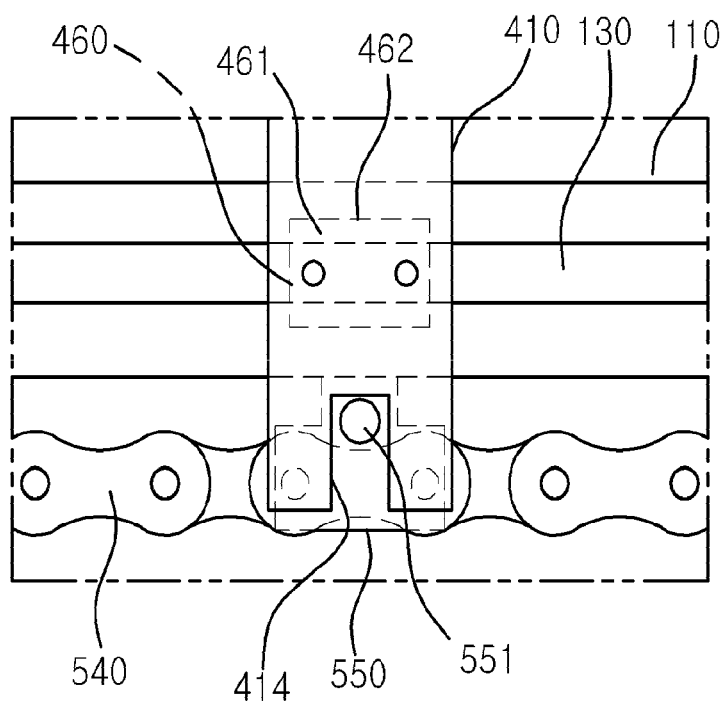
FIG. 6 is a partially enlarged front view of a state when the drive force is supplied from a drive chain of the power generator to a pillar of the light emitting portion according to an exemplary embodiment.

FIG. 6 is a partially enlarged front view showing a state in which the drive force is supplied from a drive chain of the power generator to the pillar of the light emitting portion according to an exemplary embodiment, in which a power generator 500 for supplying the drive force to the light emitting portion 400 is disposed in a space between a lower surface of the work table 100 and the floor.

The power generator 500 includes a servo motor 510 disposed on the floor under the work table 100, which may be driven by electric power to be rotated in a clockwise direction or in a counterclockwise direction in response to an electrical signal. The power generator 500 also includes first and second sprockets 520, 530 disposed on the lower surface of the work table 100 to transfer the drive force to both sides of the work table 100.

The servo motor 510 is provided with a driving pulley 512, and the first sprocket 520 is provided with a driven pulley 513, which is connected to the driving pulley 512 in a tensioned state by a driving belt 514.

The first sprocket 520 is connected to the second sprocket 530 by a driving chain 540, which is provided with a bracket 550 to transfer the drive force to the pillar 410.

In order to transfer the drive force from the driving chain 540 to the pillar 410 disposed on the side surface of the upper plate 110 of the work table 100, the bracket 550 is provided with a support pin 551 having a predetermined length to be inserted into a latch hole 414 formed at a lower end of the pillar 410 at the location of the driving chain 540, as shown in FIG. 4.

The support pin 551 is formed to protrude from the surface of the bracket 550, and the bracket 550 is secured to a side surface of the driving chain 540 by welding or by a securing screw 552.

As the bracket 550 is coupled to the side surface of the driving chain 540, the support pin 551 is latched to the latch hole 414 of the pillar 410, which is slidable along the rail groove 130 of the work table 100, by the length of the support pin 551 protruding from the bracket 550, as shown in FIG. 5.

Accordingly, the drive force generated from the servo motor 510 is transferred to the pillar 410 through the brackets 550 and the support pins 551, and the pillar 410 may slide along the rail groove 130 on the upper plate 110 of the work table 100 in the longitudinal direction of the work table 100 by the drive force transferred thereto.

In this manner, while the pillar 410 slides along the rail groove 130 of the upper plate 110, the insertion piece 461 of the guide block 460 inserted into the rail groove 130 formed on the side surface of the upper plate 110 maintains face-to-face contact with the rail groove 130, and the support piece 462 of the guide block 460 and the pillar 410 contact both outer side surfaces of the rail groove 130. As such, as the pillar 410 of the light emitting portion 400 moves on the upper plate 110 of the work table 100, a plant growing on the work table 100 can be uniformly irradiated with UV light emitted from the UV light source 440 coupled to the upper end of the pillar 410, thereby applying the stress to substantially the entire plant.

Some of the UV light emitted from the UV light source 440 of the pillar 410 is reflected by a reflective layer 620 formed on the surface of a reflection portion 600, which covers an upper portion of the cultivation bed 210, such that the backsides of leaves of the plant are irradiated with the reflected UV light, thereby intensively applying the stress to the plant growing on the work table 100.

The reflection portion 600 covering the upper portion of the cultivation bed 210 to shield the accommodation hole 220 is provided as a film, and has a dual structure in which an upper surface of the reflection portion 600 is formed of the reflective layer 620 to reflect UV light, and a lower surface of the reflection portion 600 is formed of a shielding layer 610 to maintain a low temperature environment in the accommodation hole 220.

Accordingly, the reflection portion 600 allows soil or a cultivating solution filling the accommodation hole 220 to be maintained in a low temperature state by water flowing through the flow tube 230, thereby further increasing functional material content in a plant during growth of the plant through continuous application of growth stress to a plant through roots thereof.

As such, the device according to exemplary embodiments provides an intensive application of growth stress to leaves and roots of a plant through irradiation with UV light, adjustment of a UV light emission location, and continuous cooling of the roots during growth of the plant, thereby providing an environmental condition for increasing the functional material content of the plant.

Although some exemplary embodiments have been described above, it should be understood that these embodiments are given by way of illustration only, and that various modifications, variations, changes, and alterations can be made by those skilled in the art without departing from the spirit and scope of the present disclosure. The scope of the present disclosure should be limited only by the accompanying claims and equivalents thereto.

The invention claimed is:

1. A device for UV and low temperature treatment for increasing a functional material content in a plant, comprising:
   a work table including an upper plate elevated from a floor and a rail groove formed on a side surface of the work table along a longitudinal direction thereof;
   a cultivation portion including a cultivation bed disposed on the upper plate, the cultivation bed comprising:
      an accommodation hole to accommodate soil or culturing solution therein; and
      a flow tube disposed in the soil or culturing solution and configured to supply or drain water to and from the accommodation hole;
   a supply portion including a circulation pump, the supply portion being configured to circulate water in the flow tube to lower the temperature of water below a room temperature, such that the accommodation hole has a low temperature condition from heat exchange between water and the soil or culturing solution;
   a light emitting portion comprising:
      a pillar disposed to intersect a side surface of the work table to be adjustable in height and crossing the cultivation bed, the pillar being configured to slide on the rail groove; and
      a UV light source disposed in the pillar and being configured to emit UV light toward an upper portion of the cultivation bed; and
   a power generator comprising a servo motor disposed below the work table.

2. The device for UV and low temperature treatment according to claim 1, wherein the work table further comprises a hole to couple the pillar on the side surface of the work table.

3. The device for UV and low temperature treatment according to claim 1, wherein the cultivation portion further comprises reflection portion covering an upper portion of the cultivation bed, the reflection portion comprising:
   a shielding layer configured to maintain the temperature in the cultivation bed; and
   a reflective layer formed on the shielding layer to reflect UV light emitted from the light emitting portion.

4. The device for UV and low temperature treatment according to claim 2, wherein the pillar is perpendicularly disposed with the rail groove to receive power from the power generator, the pillar comprises:
   a first adjustment bar extending from an upper end of the pillar and being adjustable in height;
   a second adjustment bar disposed at an upper end of the first adjustment bar and extending in a direction intersecting a longitudinal direction of the pillar, the second adjustment bar including a second fastening bolt disposed at the upper end of the first adjustment bar to adjust an angle of the UV light source coupled to the second adjustment bar; and
   a guide block disposed inside the pillar and inserted into the rail groove.

5. The device for UV and low temperature treatment according to claim 4, wherein the pillar further comprises:
   an adjustment hole formed through the upper end of the pillar, perpendicularly disposed on the side surface of the work table, and having an elongated shape to allow height adjustment of the pillar in the longitudinal direction;
   a latch hole formed at a lower end of the pillar to receive a drive force from the servo motor;
   a coupling groove formed between the adjustment hole and the latch hole, to which the guide block is inserted to for sliding into the rail groove; and
   a first fastening bolt inserted into the adjustment hole and screwed to a first fastening hole of the first adjustment bar to allow height adjustment of the pillar.

6. The device for UV and low temperature treatment according to claim 5, wherein the guide block comprises:
   an insertion piece protruding outwardly to pass through from an inner side to an outer side of the rail groove of the work table, such that a surface of the insertion piece contacts a surface of the rail groove while sliding on the rail groove;
   a support piece protruding from one side of the insertion piece and having a greater width than a width of the rail groove, such that that support piece slides along a periphery of the rail groove when the insertion piece slides along the rail groove; and
   a fastening screw fastened to the pillar through the support piece and the insertion piece, such that the pillar is fastened to the rail groove to slide along the side surface of the work table.

7. A device for UV and low temperature treatment for increasing a functional material content in a plant, comprising:

a work table including an upper plate elevated from a floor;
a cultivation portion including a cultivation bed disposed on the upper plate, the cultivation bed comprising:
  an accommodation hole to accommodate soil or culturing solution therein; and
  a flow tube disposed in the soil or culturing solution and configured to supply or drain water to and from the accommodation hole;
a supply portion including a circulation pump, the supply portion being configured to circulate water in the flow tube to lower the temperature of water below a room temperature, such that the accommodation hole has a low temperature condition from heat exchange between water and the soil or culturing solution;
a light emitting portion comprising:
  a pillar disposed to intersect a side surface of the work table to be adjustable in height and crossing the cultivation bed; and
  a UV light source disposed in the pillar and being configured to emit UV light toward an upper portion of the cultivation bed;
a bracket configured to adjust a location of the light emitting portion with respect to the side surface of the work table; and
a power generator comprising:
  a servo motor configured to transfer a clockwise and counterclockwise rotational force to the pillar;
  first and second sprockets disposed together with the servo motor at front and rear locations in a space under the work table, respectively, to form a clockwise/counterclockwise movement trajectory of the pillar; and
  a driving chain mounted with tension on the first and second sprockets, the bracket being configured to be driven in association with the driving chain.

8. The device for UV and low temperature treatment according to claim 1, wherein:
  the circulation pump of the supply portion is configured to supply water supplied from an exterior to the cultivation bed and discharge water subjected to heat exchange while flowing through the cultivation bed; and
  the supply portion further comprises a cooler configured to lower the temperature of the water supplied from the circulation pump.

9. The device for UV and low temperature treatment according to claim 1, further comprising a bracket configured to adjust a location of the light emitting portion with respect to the side surface of the work table.

10. The device for UV and low temperature treatment according to claim 7, wherein the power generator further comprises a support pin protruding from a side surface of the bracket to transfer the drive force to a latch hole of the pillar.

* * * * *